Jan. 26, 1954    M. J. STUMBOCK    2,667,526
METHOD OF MAKING NICKEL-CADMIUM BATTERIES
Filed Aug. 29, 1951
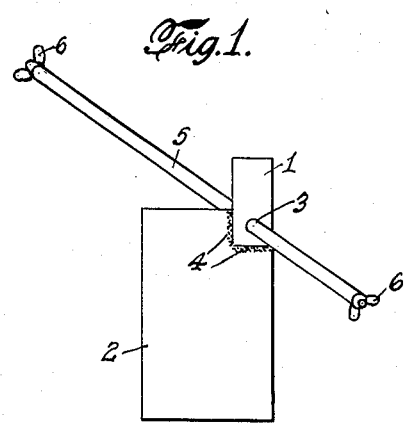
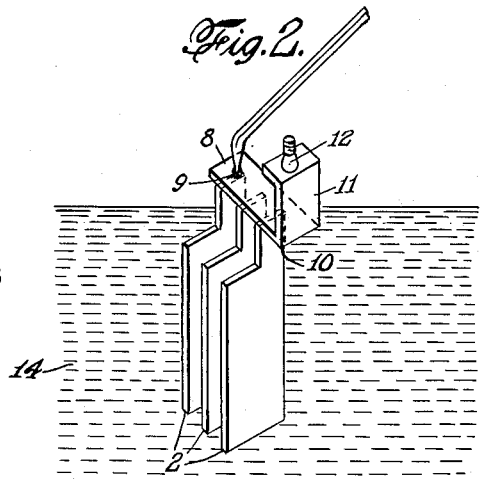
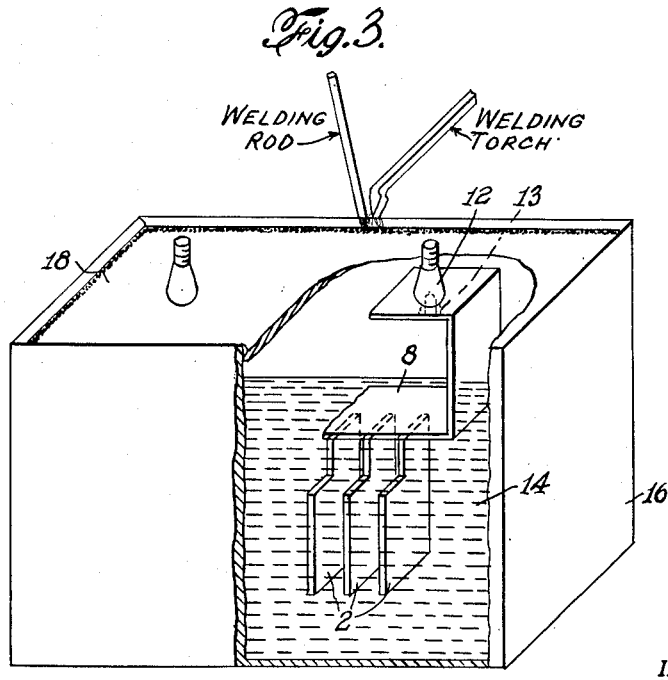
INVENTOR.
MAX J. STUMBOCK
BY
ATTORNEY Patented Jan. 26, 1954

2,667,526

UNITED STATES PATENT OFFICE 2,667,526

METHOD OF MAKING NICKEL-CADMIUM BATTERIES

Max J. Stumbock, South Orange, N. J.

Application August 29, 1951, Serial No. 244,270

7 Claims. (Cl. 136—29)

This invention relates generally to secondary batteries of the nickel-cadmium alkaline type and is more particularly concerned with a sintered-plate type of nickel cadmium alkaline storage battery.

The nickel-cadmium alkaline storage battery may be built with plates in three basic constructions, the tubular, the flat pocket, and the sintered-plate types. In each construction the negative active material is cadmium or oxides thereof and the positive active material is composed of nickel or oxides of nickel.

An object of this invention is to produce a sintered-plate type of nickel-cadmium battery that will not blister in use. A further object is to produce a sintered-plate type of nickel-cadmium battery which is more economical to manufacture and which has a longer useful life than known batteries of this type. A still further object of this invention is to provide a method of assembling nickel or cadmium oxide impregnated nickel plates into a nickel-cadmium battery.

Other objects and advantages of this invention will become readily apparent from a consideration of the description thereof hereinafter following, and from a consideration of the drawings, in which:

Figure 1 is a perspective view of a portion of the method of the invention,

Figure 2 is a perspective view of a modification of the method shown in Figure 1, and Figure 3 is a perspective view showing the final step in the method of the invention.

The flat pocket type of construction referred to above consists of filling pockets produced of perforated metal with nickel or cadmium oxide and arranging these pockets in the form of positive and negative plates. This method appears to be in commercial use at this time.

The sintered-plate construction referred to above, which is the most recently developed in the nickel-cadmium battery art, has not come into general commercial use at this time. In this method, the plate is made by converting carbonyl nickel powder into a continuous mass by heating to a temperature considerably below fusion i. e. sintering, to produce thin and highly porous plates, about 80% porosity, referred to as the plaque, which is then impregnated with the active materials (e. g. nickel or cadmium oxide) which are then used as the positive or negative plates. The nickel plate impregnated with nickel oxide is used as the positive plate, whereas the nickel plate impregnated with cadmium oxide is used as the negative plate (these two metals (i. e. nickel, cadmium) follow one another in the electromotive or activity series).

Batteries made with the sintered plate construction have been proven to be highly advantageous over the other types of nickel-cadmium battery construction. The sintered plate type of battery has a much higher capacity and discharge rate compared to its weight and volume and this increase in capacity per unit weight and volume is accomplished without the sacrifice of such other valuable characteristics of the nickel-cadmium battery as high retention of charge, ability to stand for long periods of time in a discharge condition without deterioration, ruggedness, and ability to deliver substantial capacities at high rates of discharge. In addition, it appears possible to charge this type of battery at usual rates with a much higher efficiency at temperatures as low as −40° F. and the plates are found to have more rigidity against destructive vibrations. All these advantages are made possible by the construction of a nickel-cadmium battery with thin sintered plates spaced closely together. Thus, discharges conducted at an apparent current density as high as 0.6 ampere per square inch have been possible with a material utilization of the positive active material as high as 85%.

There is, however, one serious disadvantage in the use of the sintered plate construction in the nickel-cadmium battery. This factor is the frequent appearance generally weeks or months after the battery is placed in use of large and small blisters on the face of the plates, which result in the production of short circuits and disintegration, thus making the commercial production of such batteries quite unreliable.

In the assembly of the impregnated sintered plates into the battery can several procedures are available. As shown in Figure 1, a sub-assembly may be made of sintered plates having a solid metal head piece 1 welded at 4 to the top of the plate 2 which has a hole 3 therein of a suitable size so that the impregnated plates interspersed with spacer plates can be pushed onto a connecting rod 5 and securely held in place by tie nuts 6 at each end of the rod. For the sake of simplicity only one such plate 2 is shown in Figure 1. Alternately, as shown in Figure 2, a sub-assembly can be made of the sintered plates 2 having a solid metal headpiece 8 welded as at 9 to the top of the plate with a narrow index strip 10 extending a few inches upward at one of the sides of the plates. According to this latter method the impregnated plates are interspersed with spacer plates and arranged with the side strips in alignment and then the strips are torch welded together and to the connecting pieces 8, one for each group of positive or negative plates. The connecting pieces or headpiece 8 has a bracket 11 formed at one end thereof which mounts the pole stud 12 as by a fastener 13.

The sub-assemblies made according to either of the procedures indicated above are then placed in a metal battery can and the battery can cover which holds therein the battery terminal pole studs is placed thereover and welded to the can. As shown in Figure 3, the sub-assembly of Figure 2 is placed in the metal battery can 16 and the cover 18 (being mounted on the sub-assembly of Figure 2) is welded to the can 16.

I have discovered that the occurrence of blisters is due to faults produced in the impregnated plates during the welding operations.

It is well known that both NiO and CdO, and especially the former should not be heated to high temperatures. I have determined a maximum upper limit by experiment to be about 200° F. I have further determined that when these oxides are heated above about 200° F. they become electrolytically inefficient and when using these oxides in a sintered plate construction for a nickel-cadmium battery they should not be subjected to a temperature above the range of from 115° F. to 135° F.

I have observed that during the aforementioned welding operations on the headpieces as well as on the can covers the temperature of the impregnated plates was driven much above 200° F. and varied between 250° F. to 350° F.

Therefore, it is necessary in performing the welding operations to subject the plates to a cooling medium. This can be done by directing a stream of supercooled or surfused gas or liquid 14 upon the plates (see Figure 2) or by submerging the plates completely either in water or the alkaline electrolyte solution (e. g. 20% sodium hydroxide and water) (see Figure 3) during all of these welding operations. It is thus possible to keep the plates and the solution at temperatures less than 100° F. and therefore produce a battery which has better performance characteristics and which will allow no blisters to form on any of the plates.

Having thus described my invention, what I claim and desire to protect by Letters Patent is:

1. The method of assembling a nickel-cadmium storage battery of the sintered plate type comprising thermally decomposing carbonyl nickel into carbonyl nickel powder, sintering said carbonyl nickel powder into highly porous plates, impregnating said plates with an oxide taken from the group consisting of NiO and CdO, welding a metallic headpiece member onto said plates, interspersing separator plate members between said impregnated plates, assembling all of said plates into a composite unit, inserting said composite plate unit into a metallic battery can and welding a metallic can cover including battery terminal post studs onto said battery can; said welding steps being performed while keeping said plates at a temperature not exceeding 200° F. by submerging them in a coolant medium whose temperature does not exceed 100° F.

2. The method of claim 1 wherein said headpiece members have aligned holes therein through which a connecting rod is adapted to be inserted and including assembling said impregnated plates and said separator plates onto said rod and mechanically securing them thereto, and wherein said coolant medium is a directed stream of a surfused fluid.

3. The method of assembling a nickel-cadmium storage battery of the sintered plate type wherein its useful life is increased comprising thermally decomposing carbonyl nickel into carbonyl nickel powder, sintering said carbonyl nickel powder into highly porous plate, impregnating said plates with an oxide taken from the group consisting of NiO and CdO, welding a metallic headpiece member having upwardly extending aligned metallic index strips affixed thereon to said plates, aligning said impregnated plates with interspersed separator plates, welding said aligned strips together to assemble all of said plates into a composite unit, inserting said composite plate unit into a metallic battery can and welding a metallic can cover including battery terminal post studs onto said battery can; said welding steps being performed while keeping said plates at a temperature not exceeding 200° F. by submerging them in a coolant medium whose temperature does not exceed 100° F.

4. The method of claim 3 wherein said welding steps are performed while submerging said plates in an alkaline electrolyte solution.

5. The method of preventing the delayed formation of blisters on the plates of nickel-cadmium storage batteries of the sintered plate type and thereby increasing the life thereof including the steps of welding a metallic headpiece member onto said plates, interspersing separator plate members between said impregnated plates, assembling all of said plates into a composite unit, inserting said composite plate unit into a metallic battery can and welding a metallic can cover including battery terminal post studs onto said battery can, said welding steps being performed while keeping said plates at a temperature not exceeding 200° F. by entirely submerging them in a coolant medium whose temperature does not exceed 100° F.

6. The method of claim 5 wherein said headpiece members have aligned holes therein through which a connecting rod is adapted to be inserted and including assembling said impregnated plates and said separator plates onto said rod and mechanically securing them thereto, and wherein said coolant medium is a solution of 20% sodium hydroxide in water.

7. The method of claim 5 wherein said headpiece member has upwardly extending aligned and spaced metallic index strips, welding said strips to said plates, aligning said impregnated sintered plates with interspersed separator plates, and welding said aligned strips together to assemble all of said plates into a composite unit, said coolant medium being a supercooled fluid.

MAX J. STUMBOCK.

References Cited in the file of this patent

UNITED STATES PATENTS

| Number | Name | Date |
|--------|------|------|
| 1,055,261 | Ellinger | Mar. 4, 1913 |
| 1,691,522 | Kobert | Nov. 13, 1928 |
| 1,715,020 | Grimmenstein | May 28, 1929 |
| 1,827,210 | Siebs | Oct. 13, 1931 |
| 2,004,552 | Drumm | June 11, 1935 |
| 2,198,042 | Schlecht | Apr. 23, 1940 |
| 2,287,802 | Hill | June 30, 1942 |